US009605612B2

(12) United States Patent
Brennan

(10) Patent No.: US 9,605,612 B2
(45) Date of Patent: Mar. 28, 2017

(54) SYSTEM AND METHOD FOR DETERMINING THE SPEED OF AN ENGINE WHEN ONE OR MORE CYLINDERS OF THE ENGINE ARE DEACTIVATED

(71) Applicant: GM Global Technology Operations LLC, Detroit, MI (US)

(72) Inventor: Daniel G. Brennan, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 84 days.

(21) Appl. No.: 14/739,254

(22) Filed: Jun. 15, 2015

(65) Prior Publication Data

US 2016/0363067 A1 Dec. 15, 2016

(51) Int. Cl.
| | | |
|---|---|---|
| *B60W 10/06* | (2006.01) | |
| *F02D 41/00* | (2006.01) | |
| *B60W 30/188* | (2012.01) | |
| *B60W 10/02* | (2006.01) | |
| *F02D 29/02* | (2006.01) | |
| *F02D 31/00* | (2006.01) | |
| *F02D 41/26* | (2006.01) | |

(52) U.S. Cl.
CPC ....... *F02D 41/0087* (2013.01); *B60W 10/023* (2013.01); *B60W 10/06* (2013.01); *B60W 30/188* (2013.01); *F02D 29/02* (2013.01); *F02D 31/001* (2013.01); *F02D 41/26* (2013.01); *B60W 2710/025* (2013.01); *B60W 2710/0644* (2013.01)

(58) Field of Classification Search
CPC F02D 31/001; F02D 41/0087; B60W 10/023; B60W 10/06
See application file for complete search history.

(56) References Cited

U.S. PATENT DOCUMENTS

| | | | | |
|---|---|---|---|---|
| 9,494,088 | B1* | 11/2016 | Serrano | F02D 17/02 |
| 2014/0041626 | A1* | 2/2014 | Wilcutts | F02D 41/00 |
| | | | | 123/350 |
| 2014/0045652 | A1* | 2/2014 | Carlson | B60W 10/06 |
| | | | | 477/109 |
| 2015/0354470 | A1* | 12/2015 | Li | F02D 41/1406 |
| | | | | 701/54 |

* cited by examiner

*Primary Examiner* — Huan Le

(57) ABSTRACT

A system according to the principles of the present disclosure includes a firing fraction module, an engine speed module, and an actuator control module. The firing fraction module determines a target firing fraction corresponding to a target number of activated cylinders out of a first number of cylinders in a firing order of an engine. The first number is a denominator of the target firing fraction. The engine speed module determines a plurality of periods based on a crankshaft position signal, with each of the periods corresponding to a predetermined amount of crankshaft rotation. The engine speed module determines the speed of the engine based on the plurality of periods and the target firing fraction. The actuator control module controls an actuator of at least one of the engine and a torque converter based on the engine speed.

20 Claims, 3 Drawing Sheets

SYSTEM AND METHOD FOR DETERMINING THE SPEED OF AN ENGINE WHEN ONE OR MORE CYLINDERS OF THE ENGINE ARE DEACTIVATED

FIELD

The present disclosure relates to internal combustion engines, and more specifically, to systems and methods for determining the speed of an engine when one or more cylinders of the engine are deactivated.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Cylinders of an engine may be deactivated to improve fuel economy and reduce emissions. The cylinders may be deactivated by halting generation of spark within the cylinders, halting delivery of fuel to the cylinders, and disabling intake and exhaust valves of the cylinders. In some engines, each intake and exhaust valve may be independently disabled, providing the ability to continuously adjust the number of deactivated cylinders and/or to adjust which cylinders are deactivated.

Deactivating cylinders of an engine may cause significant variation in engine speed. Engine control systems typically use the engine speed to determine target actuator values such as target spark timing, a target cam phaser position, and a target torque converter slip. Thus, variation in the engine speed due to cylinder deactivation may cause undesired variation in the target actuator values.

SUMMARY

A system according to the principles of the present disclosure includes a firing fraction module, an engine speed module, and an actuator control module. The firing fraction module determines a target firing fraction corresponding to a target number of activated cylinders out of a first number of cylinders in a firing order of an engine. The first number is a denominator of the target firing fraction. The engine speed module determines a plurality of periods based on a crankshaft position signal, with each of the periods corresponding to a predetermined amount of crankshaft rotation. The engine speed module determines the speed of the engine based on the plurality of periods and the target firing fraction. The actuator control module controls an actuator of at least one of the engine and a torque converter based on the engine speed.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
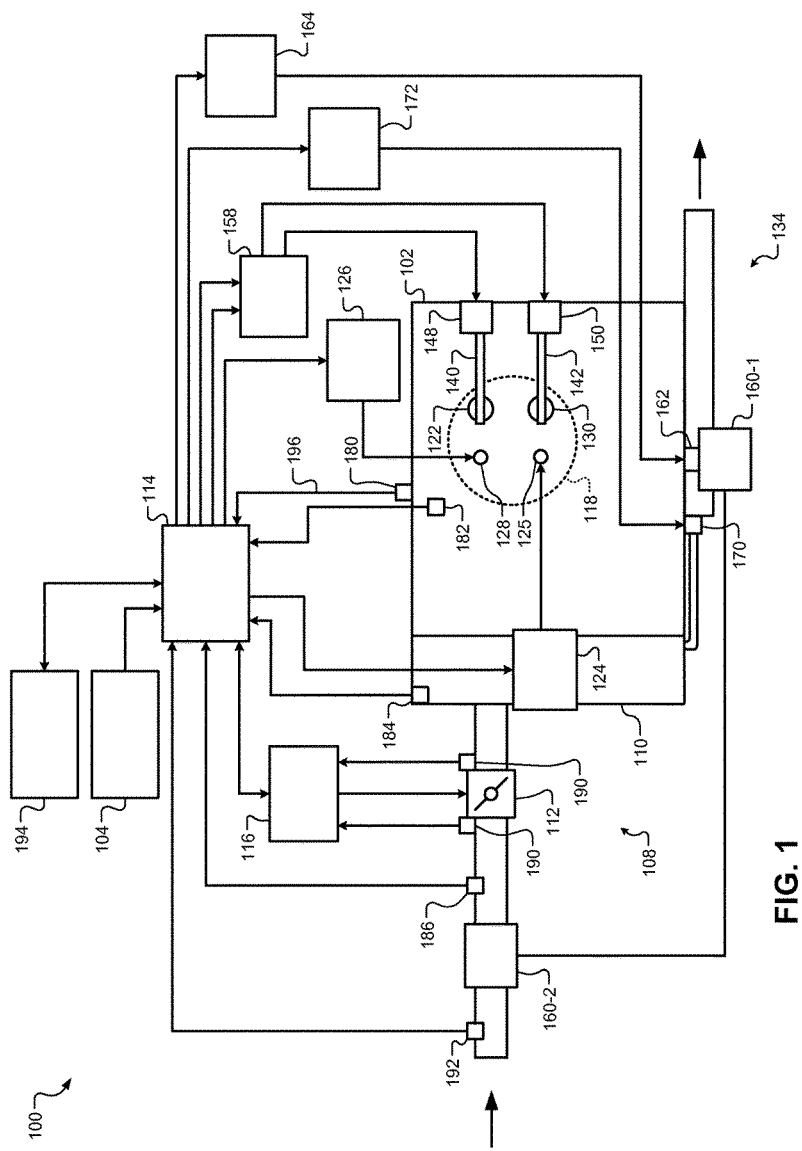
FIG. 1 is a functional block diagram of an example engine system according to the principles of the present disclosure.

Engine control systems typically determine engine speed based on a period that elapses as a predetermined number of teeth on a crankshaft position sensor are detected. For example, a predetermined amount of crankshaft rotation corresponding to the predetermined number of teeth may be divided by the elapsed period to obtain the engine speed. The resolution of the engine speed may be increased by decreasing the predetermined number of teeth and vice versa.

Engine control systems may also determine a target firing fraction based on a target number of deactivated cylinders. The target firing fraction corresponds to a target number of cylinders to be activated out of some number of cylinders that are next in a predetermined firing order of an engine. Thus, the numerator of the target firing fraction is the target number of cylinders to be activated. The denominator of the target firing fraction may be equal to a minimum number of cylinders in a repeating pattern of firing and non-firing cylinders.

Deactivating one or more cylinders of an engine may increase the variation in the period that elapses as the predetermined number of teeth are detected, which may increase the variation in the engine speed determined based on the period. This variation in the engine speed may be reduced by decreasing the resolution of the engine speed, which may be accomplished by increasing the number of predetermined number of teeth used to determine the engine speed. However, target actuator values may be determined based on the engine speed, and decreasing the resolution of the engine speed may increase the time that elapses before the target actuator values are adjusted in response to changes in the engine speed.

A system and method according to the present disclosure minimizes variation in engine speed while maintaining an acceptable response time by determining the engine speed based on the denominator of the firing fraction. In one example, the system and method generates a signal indicating a plurality of periods, with each of the periods corresponding to a predetermined number of tooth detections. The system and method then filters the signal based on the denominator of the firing fraction and determines the engine speed based on the filtered signal.

In another example, the system and method filters the signal indicating the periods by determining an average value of a selected number of the periods, where the selected number is equal to the denominator of the firing fraction. The system and method may then determine the engine speed based on the average value of the periods. For example, the system and method may divide a predetermined amount of crankshaft rotation corresponding to the periods by the average value of the periods to obtain the engine speed. When the denominator of the target firing fraction changes, the system and method may adjust the selected number from a previous value of the denominator to a current value of the denominator in increments of one each time the engine speed is determined. This may further reduce variation in the engine speed.

Referring now to FIG. 1, an engine system 100 includes an engine 102 that combusts an air/fuel mixture to produce drive torque for a vehicle. The amount of drive torque produced by the engine 102 is based on a driver input from a driver input module 104. The driver input may be based on a position of an accelerator pedal. The driver input may also be based on a cruise control system, which may be an adaptive cruise control system that varies vehicle speed to maintain a predetermined following distance.

Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injections performed by a fuel injector 125 to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt generation of spark in deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake and exhaust cam phasers 148 and 150 based on signals from the ECM 114. When implemented, variable valve lift may also be controlled by the phaser actuator module 158.

The ECM 114 may deactivate the cylinder 118 by instructing the phaser actuator module 158 to disable opening of the intake valve 122 and/or the exhaust valve 130. The phaser actuator module 158 may disable opening of the intake valve 122 by decoupling the intake valve 122 from the intake camshaft 140. Similarly, the phaser actuator module 158 may disable opening of the exhaust valve 130 by decoupling the exhaust valve 130 from the exhaust camshaft 142. In various implementations, the phaser actuator module 158 may control the intake valve 122 and/or the exhaust valve 130 using devices other than camshafts, such as electromagnetic or electrohydraulic actuators.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, which compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The exhaust system 134 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 uses signals from the sensors to make control decisions for the engine system 100.

The ECM 114 may communicate with a transmission control module (TCM) 194 to coordinate operation of the engine 102, a transmission (not shown), and/or a torque converter (not shown) that couples the engine 102 to the transmission. For example, the TCM 194 may shift the transmission, and the ECM 114 may reduce the torque output of the engine 102 during a transmission gear shift. In another example, the ECM 114 may determine the speed of the engine 102 based on a CKP signal 196 generated by the CKP sensor 180, and the TCM 194 may adjust torque converter slip based on the engine speed. As discussed in more detail below, the ECM 114 may determine the engine speed based on the CKP signal 196 and a denominator of a target firing fraction. In various implementations, various functions of the ECM 114 and the TCM 194 may be integrated into one or more modules.

Figure 2:
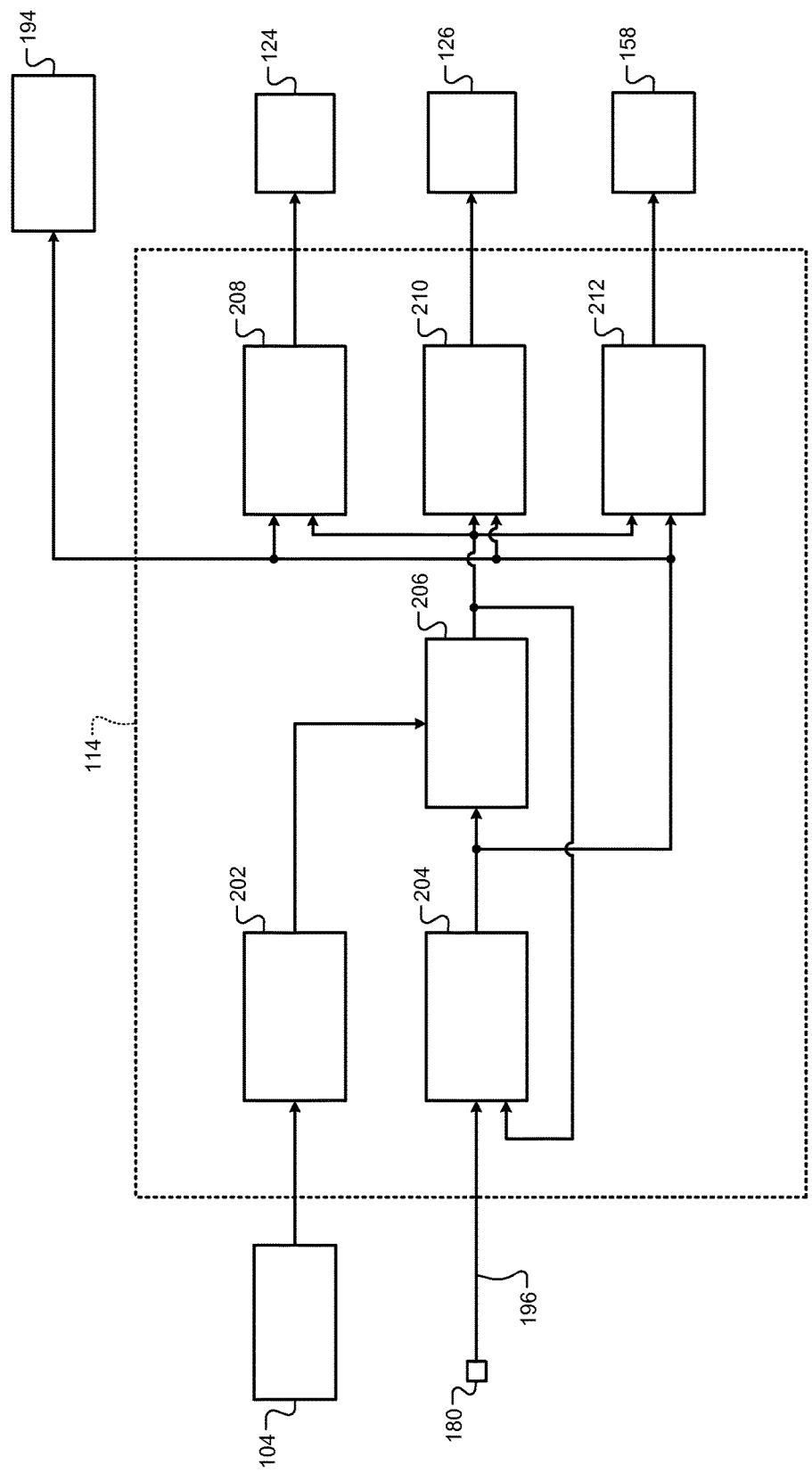
FIG. 2 is a functional block diagram of an example control system according to the principles of the present disclosure.

Referring now to FIG. 2, an example implementation of the ECM 114 includes a torque request module 202, an engine speed module 204, a firing fraction module 206, a fuel control module 208, a spark control module 210, and a phaser control module 212. The torque request module 202 determines a driver torque request based on the driver input from the driver input module 104. For example, the torque request module 202 may store one or more mappings of accelerator pedal position to desired torque, and may determine the driver torque request based on a selected one of the mappings. The torque request module 202 outputs the driver torque request.

The engine speed module 204 determines the speed of the engine 102 based on the CKP signal 196 from the CKP sensor 180. For example, the CKP signal 196 may indicate when teeth on the CKP sensor 180 are detected, and the engine speed module 204 may measure a period that elapses as a predetermined number of teeth on the CKP sensor 180 are detected. The engine speed module 204 may then determine the engine speed based on the measured period and a predetermined amount of crankshaft rotation corresponding to the predetermined number of teeth. For example, the CKP sensor 180 may include 58 teeth, and the spacing between the leading edges of two adjacent teeth may correspond to six degrees of crankshaft rotation. Thus, if the predetermined number of teeth is 15, the predetermined amount of crankshaft rotation may be 90 degrees. The engine speed module 204 may divide the predetermined amount of crankshaft rotation by the corresponding (measured) period to obtain the engine speed. The engine speed module 204 may decrease the predetermined number of teeth (e.g., to one) to increase the resolution of the engine speed and vice versa. The engine speed module 204 outputs the engine speed.

The firing fraction module 206 determines a target firing fraction of the engine 102. The target firing fraction corresponds to a target number (M) of cylinders to be activated out of a first number (N) of upcoming cylinders in a predetermined firing order of the engine 102. Thus, the numerator of the target firing fraction is the target number (M) of cylinders to be activated, and the denominator of the target firing fraction is the first number (N) of upcoming cylinders in the predetermined firing order. The first number (N) may be a minimum number of cylinders in a repeating pattern of firing and non-firing cylinders.

In one example, a target firing fraction of ⅝ indicates that 5 of the next 8 cylinders in the predetermined firing order should be activated. Thus, in this example, 3 of the next 8 cylinders in the predetermined firing order should be deactivated. A target firing fraction of 0 corresponds to all of the cylinders of the engine 102 being deactivated (and 0 being activated), and a target firing fraction of 1 corresponds to all of the cylinders of the engine 102 being activated (and 0 being deactivated).

The firing fraction module 206 may determine the target firing fraction based on the driver torque request, the engine speed, and a current gear ratio of the transmission. For example, the firing fraction module 206 may determine the target firing fraction using one of a function and a mapping that relates driver torque requests, engine speeds, and gear ratios to target firing fractions. The firing fraction module 206 may receive the current gear ratio of the transmission from the TCM 194. The firing fraction module 206 outputs the target firing fraction.

In various implementations, the firing fraction module 206 may determine a firing pattern of the engine 102 that achieves the target firing fraction. The firing pattern may indicate which cylinders in the predetermined firing order of the engine 102 are activated and which cylinders are deactivated. The firing pattern may be specified for each engine cycle, where each engine cycle corresponds to 720 degrees of crankshaft rotation. For example, for an 8-cylinder engine having a firing order of 1-8-7-2-6-5-4-3, a firing pattern of 1-8-7-2-5-3 may be specified for one engine cycle, indicating that cylinders 1, 8, 7, 2, 5, and 3 are activated while cylinders 6 and 4 are deactivated.

Alternatively, the firing pattern may be specified for a number of cylinder events that is less than or greater than the number of cylinder events included in an engine cycle. A cylinder event may refer to a firing event and/or a crank angle increment during which spark is generated in a cylinder when the cylinder is active. For example, for the example 8-cylinder engine discussed above, a firing pattern of 1-7-2-5-4-1-8-2-6-4-3-8-7-6-5-3 may be specified. Notably, this firing pattern yields a cylinder event pattern of two activated cylinders followed by one activated cylinder. Thus, the firing fraction achieved using this firing pattern is ⅔, with 3 being the minimum number of cylinders in a repeating pattern of firing and non-firing cylinders.

The fuel control module 208, the spark control module 210, and the phaser control module 212 may control fuel delivery, spark generation, and valve deactivation, respectively, based on the firing pattern. For example, the fuel control module 208 may halt fuel delivery to deactivated cylinders, the spark control module 210 may halt spark generation in deactivated cylinders, and the phaser control module 212 may deactivate valves of deactivated cylinders. The fuel control module 208 may control fuel delivery by sending a target fueling rate to the fuel actuator module 124. The spark control module 210 may control spark generation by sending target spark timing to the spark actuator module 126. The phaser control module 212 may control valve deactivation by sending a target valve state (e.g., enabled/disabled) to the phaser actuator module 158. Additionally or alternatively, the phaser control module 212 may send a target cam phaser position to the phaser actuator module 158 to adjust the positions or angles of the intake and exhaust cam phasers 148 and 150.

The engine speed module 204 may use the denominator of the firing fraction when determining the engine speed based on the CKP signal 196. As discussed above, the engine speed module 204 may determine the engine speed based on a period that elapses as a predetermined number of teeth on the CKP sensor 180 are detected. In addition, the engine speed module 204 may generate a signal indicating a plurality of periods that each correspond to a predetermined number of tooth detections. The engine speed module 204 may then filter the signal based on the denominator of the firing fraction and determine the engine speed based on the filtered signal.

The engine speed module 204 may filter the signal indicating the periods by determining an average value of a second number (P) of the plurality of periods. The engine speed module 204 may then divide a predetermined amount of crankshaft rotation corresponding to the second number of periods by the sum of the periods to obtain the engine speed. The engine speed module 204 may determine the second number based on the denominator of the firing fraction. For example, the engine speed module 204 may set the second number equal to the denominator of the firing fraction.

When the denominator of the firing fraction changes, the engine speed module 204 may adjust the second number from a previous value of the denominator of the firing fraction to a present value of the denominator of the firing fraction. The engine speed module 204 may adjust the second number from the previous value of the denominator to the present value of the denominator by increments of one each time that the engine speed module 204 determines the engine speed. For example, if the denominator of the firing fraction changes from 3 to 6, the engine speed module 204 may adjust the second number to 4, 5, and 6 for the first, second, and third engine speed determinations, respectively, after the firing fraction change.

The fuel control module 208, the spark control module 210, and the phaser control module 212 may determine the target fueling rate, the target spark timing, and the target cam phaser position, respectively, based on the engine speed. Additionally or alternatively, the TCM 194 may determine a target torque converter slip based on the engine speed. The fuel control module 208, the spark control module 210, the phaser control module 212, and the TCM 194 may be referred to as actuator control modules. The target fueling rate, the target spark timing, the target cam phaser position, and target torque converter slip may be referred to as target actuator values. The actuator control modules may determine the target actuator values using one of a function and a mapping that relates engine speed, and possibly other engine operating conditions, to the target actuator values.

Figure 3:
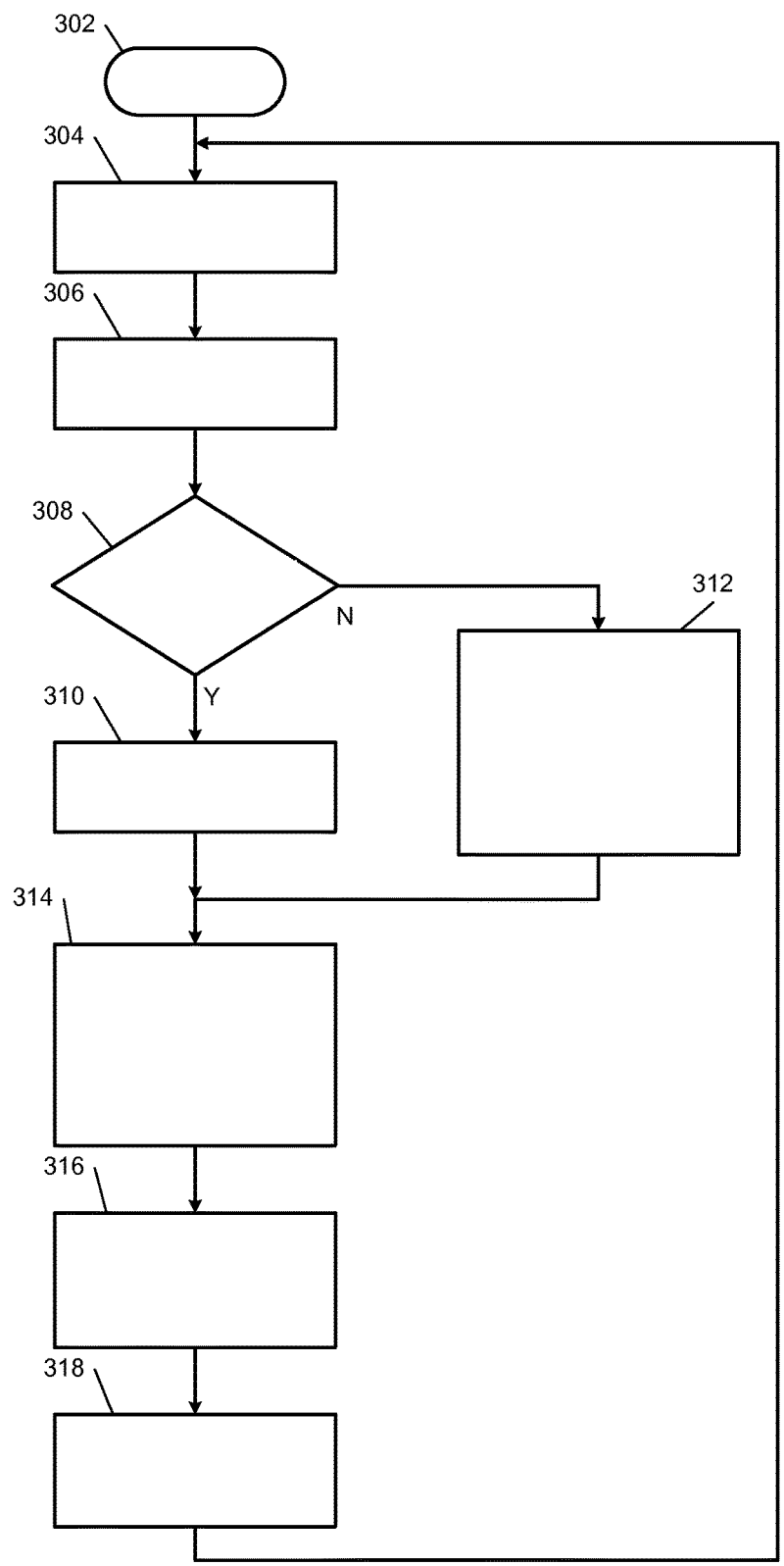
FIG. 3 is a flowchart illustrating an example control method according to the principles of the present disclosure.

Referring now to FIG. 3, a method for determining the speed of the engine 102 when one or more cylinders of the engine 102 are deactivated begins at 302. The method is described in the context of the modules of FIG. 2. However, the particular modules that perform the steps of the method may be different than the modules mentioned below and/or the method may be implemented apart from the modules of FIG. 2.

At 304, the torque request module 202 determines the driver torque request. At 306, the firing fraction module 206 determines the target firing fraction. At 308, the engine speed module 204 determines whether the denominator of the target firing fraction is unchanged relative to a previous value of the denominator. In other words, the engine speed module 204 determines whether a current value of the denominator determined in a current iteration is the same as the previous value of the denominator determined in a previous iteration.

If the current value of the denominator is the same as the previous value of the denominator, the method continues at 310. Otherwise, the method continues at 312. At 310, the engine speed module 204 sets the second number (P) equal to the denominator of the target firing fraction.

At 312, the engine speed module 204 adjusts the second number (P) from the previous value of the denominator of the target firing fraction to the current value of the denominator in increments of one each time the engine speed is determined. For example, the engine speed module 204 may determine the engine speed once during each iteration loop depicted in FIG. 3. Thus, the engine speed module 204 may adjust the second number by one for each execution of the iteration loop depicted in FIG. 3.

At 314, the engine speed module 304 determines an average value of the second number (P) of a plurality of periods, with each of the periods corresponding to a predetermined amount of crankshaft rotation. At 316, the method determines the engine speed based on the average value of the second number (P) of the periods. At 318, one more of the control modules 194, 210, and 212 adjust target actuator values based on the engine speed. The target actuator values adjusted may include the target spark timing, the target cam phaser position, and the target torque converter slip.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A system comprising:
   a firing fraction module that determines a target firing fraction corresponding to a target number of activated cylinders out of a first number of cylinders in a firing order of an engine, wherein the first number is a denominator of the target firing fraction;
   an engine speed module that:
      determines a plurality of periods based on a crankshaft position signal, with each of the periods corresponding to a predetermined amount of crankshaft rotation; and
      determines a speed of the engine based on the plurality of periods and the target firing fraction; and
   an actuator control module that controls an actuator of at least one of the engine and a torque converter based on the engine speed.

2. The system of claim 1 wherein the engine speed module:
   generates a signal indicating the plurality of periods;
   filters the signal based on the target firing fraction; and
   determines the engine speed based on the filtered signal.

3. The system of claim 1 wherein the engine speed module:
   generates a signal indicating the plurality of periods;
   filters the signal based on the denominator of the target firing fraction; and
   determines the engine speed based on the filtered signal.

4. The system of claim 1, wherein the first number represents a minimum number of cylinders in a repeating pattern of firing cylinders and non-firing cylinders.

5. The system of claim 1 wherein the firing fraction module determines the target firing fraction based on the engine speed and a driver torque request.

6. The system of claim 1 wherein the actuator control module adjusts at least one of target spark timing, a target cam phaser position, and a target torque converter slip based on the engine speed.

7. The system of claim 1 wherein the engine speed module:
determines a second number based on the target firing fraction;
determines an average value of the second number of the periods; and
determines the engine speed based on the average value of the periods.

8. The system of claim 7 wherein the engine speed module determines the second number based on the denominator of the target firing faction.

9. The system of claim 8 wherein the engine speed module sets the second number equal to the denominator of the target firing faction.

10. The system of claim 9 wherein, when the denominator of the target firing fraction changes, the engine speed module adjusts the second number from a previous value of the denominator to a current value of the denominator in increments of one each time the engine speed is determined.

11. A method comprising:
determining a target firing fraction corresponding to a target number of activated cylinders out of a first number of cylinders in a firing order of an engine, wherein the first number is a denominator of the target firing fraction;
determining a plurality of periods based on a crankshaft position signal, with each of the periods corresponding to a predetermined amount of crankshaft rotation;
determining a speed of the engine based on the plurality of periods and the target firing fraction; and
controlling an actuator of at least one of the engine and a torque converter based on the engine speed.

12. The method of claim 11 further comprising:
generating a signal indicating the plurality of periods;
filtering the signal based on the target firing fraction; and
determining the engine speed based on the filtered signal.

13. The method of claim 11 further comprising:
generating a signal indicating the plurality of periods;
filtering the signal based on the denominator of the target firing fraction; and
determining the engine speed based on the filtered signal.

14. The method of claim 11, wherein the first number represents a minimum number of cylinders in a repeating pattern of firing cylinders and non-firing cylinders.

15. The method of claim 11 further comprising determining the target firing fraction based on the engine speed and a driver torque request.

16. The method of claim 11 further comprising adjusting at least one of target spark timing, a target cam phaser position, and a target torque converter slip based on the engine speed.

17. The method of claim 11 further comprising:
determining a second number based on the target firing fraction;
determining an average value of the second number of the periods; and
determining the engine speed based on the average value of the periods.

18. The method of claim 17 further comprising determining the second number based on the denominator of the target firing faction.

19. The method of claim 18 further comprising setting the second number equal to the denominator of the target firing faction.

20. The method of claim 19 further comprising, when the denominator of the target firing fraction changes, adjusting the second number from a previous value of the denominator to a current value of the denominator in increments of one each time the engine speed is determined.

* * * * *